Figure 1:
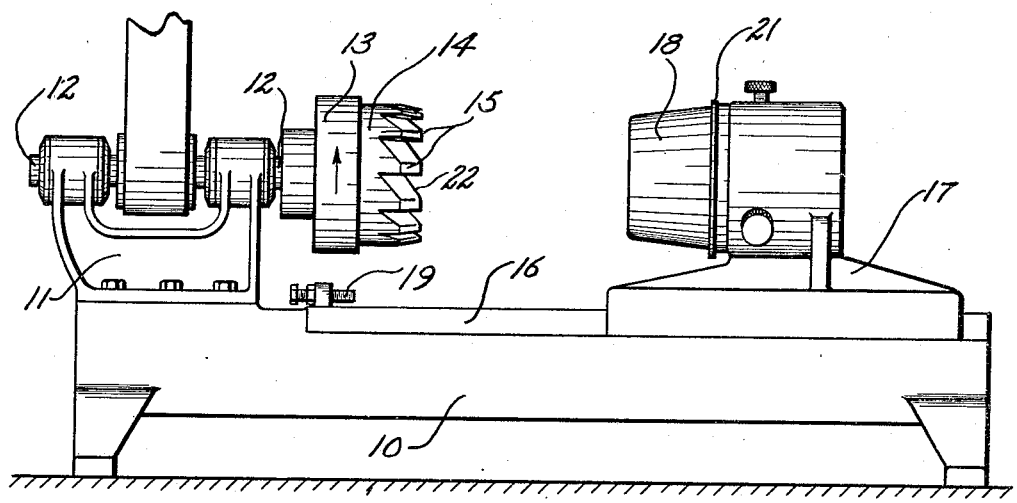

Sept. 13, 1932.  E. T. SMITH  1,876,775

CUTTER FOR SKIVING MACHINES

Filed May 21, 1930

INVENTOR.
Emory T. Smith.
BY
Robert T. Harvey
ATTORNEY.

Patented Sept. 13, 1932

1,876,775

UNITED STATES PATENT OFFICE

EMORY T. SMITH, OF LUDLOW, MASSACHUSETTS, ASSIGNOR TO THE FISK RUBBER COMPANY, OF CHICOPEE FALLS, MASSACHUSETTS, A CORPORATION OF MASSACHUSETTS

CUTTER FOR SKIVING MACHINES

Application filed May 21, 1930. Serial No. 454,284.

My invention relates to skiving machines and more particularly to a cutter used in machines of this character which are adapted to skive the ends of tubes, such as are used in the manufacture of inner tubes for pneumatic tires.

One of the objects of my invention is to provide an improved type of cutter which will perform the skiving operation faster and easier than the cutters now in use and because of its improved features the rubber stock being skived will be less deformed, thus producing a cleaner, more uniform skive. Other objects will be apparent from the following specification and claims.

Figure 2:
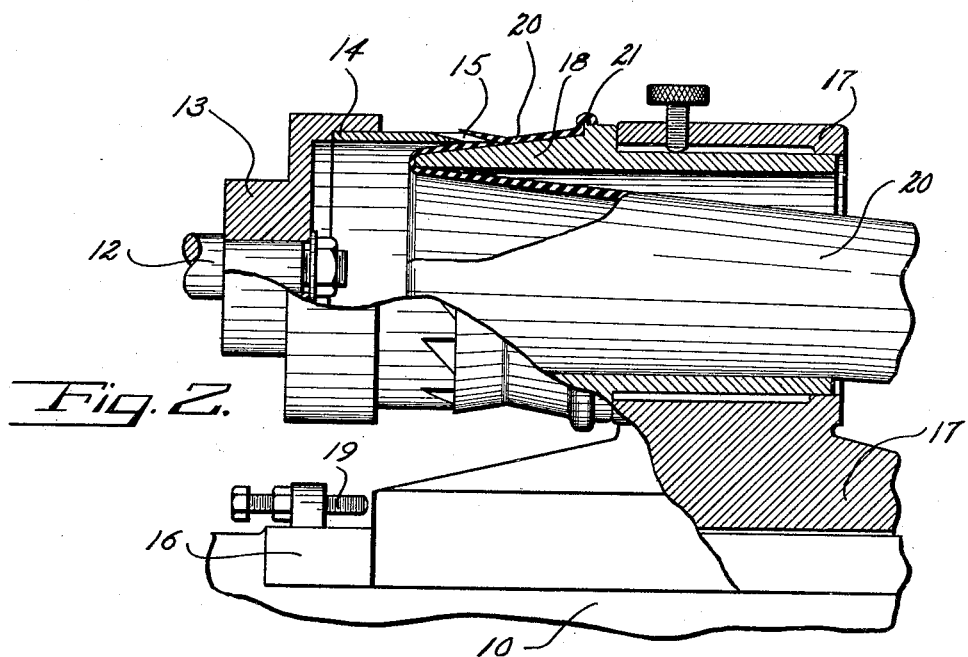

In the drawing illustrating one embodiment of my invention,

Fig. 1 is a side view of a machine equipped with a cutter embodying the improvements constituting my invention and showing the position of parts when in inoperative position; and Fig. 2 is a partial side view, partly in section and on a larger scale, showing the cutter skiving an end of a rubber tube.

In the drawing, 10 represents a base on one end of which is bolted an arbor bead 11 which serves to mount a belt driven arbor 12 on one end of which is mounted, as shown in Fig. 2, a cutter holder 13, the latter being rotated in the direction indicated by the arrow shown in Fig. 1. Mounted in the cutter holder 13 is a hollow cylindrical cutter 14, the cutting edge of which is made up of a plurality of tooth-shaped portions 15.

A slide 16 formed on the base 10 is engaged by a sliding carriage 17 in which is adjustably secured a hollow conical skiving bob 18, as shown in Fig. 2, the axis of the latter being in line with the axis of the cutter 14. An adjustable stop 19 limits the movement of the carriage 17 and skiving bob 18 toward the cutter.

The operation of skiving the end of a tube is as follows: The end of a tube 20 is threaded through the skiving bob 18 and then folded back as shown in Fig. 2. A ring 21 formed on the skiving bob 18 serves to hold the end of the tube firmly on the bob. The operator then pushes the skiving bob toward the knife, as shown in Fig. 2, until the adjustable stop 19 is encountered. This should be so adjusted that the skiving bob will properly telescope within the cutter.

Preferably the tooth portions 15 of the cutter 14 have a total leading edge of approximately one-third of the leading edge that a corresponding plain cutter would have, thus substantially reducing the resistance encountered when the tube is pushed into the cutter, the angular cutting edges 22 of the tooth portions doing the greater part of the cutting. The angular cutter produces an easier and cleaner cut and I have found that a cutter such as I have disclosed and described will skive raw inner tube stock, more quickly and easily, without deforming the rubber, and produce a better skive than will a cutter of the prior art.

The number of tooth portions may be varied, and also their cutting angle, to meet the various cutting conditions encountered by various gauge stocks, skiving angles, etc.

Having thus described my invention, I claim:

1. In a device of the character described a rotating cylindrical cutter the cutting edge of which comprises a plurality of tooth-shaped portions formed with knife-like leading cutting edges and rearwardly extending knife-like cutting edges, the latter being of substantially greater length than the former.

2. In a device of the character described, a rotating cylindrical cutter presenting a complete annular cutting edge which comprises a plurality of teeth having beveled, sharp leading cutting edges and intermediate rearwardly inclined cutting edges.

3. In a device of the character described, a rotating cylindrical cutter presenting a complete annular cutting edge which comprises a plurality of equally spaced teeth having beveled, sharp leading cutting edges, constituting substantially one-third of the leading edge of the cutter, and intermediate rearwardly inclined cutting edges.

EMORY T. SMITH.